US006390022B1

(12) United States Patent
Eichler et al.

(10) Patent No.: US 6,390,022 B1
(45) Date of Patent: May 21, 2002

(54) ANIMAL WATERING APPARATUS

(75) Inventors: Richard Eichler; Jack Looney, both of Napa, CA (US)

(73) Assignee: Lixit Corporation, Napa, CA (US)

( * ) Notice: Subject to any disclaimer, the term of this patent is extended or adjusted under 35 U.S.C. 154(b) by 0 days.

(21) Appl. No.: 09/541,547

(22) Filed: Apr. 3, 2000

(51) Int. Cl.$^7$ .......................... A01K 7/00; B65D 39/02
(52) U.S. Cl. ...................... 119/72; 119/72.5; 119/75; 119/464; 119/475; 119/515; 215/237
(58) Field of Search ........................ 119/72, 72.5, 75, 119/464, 465, 466, 467, 475, 477, 515; 220/203.04, 203.05, 203.09, 819, 826, 244, 254, 259, 791, 793; 215/237

(56) References Cited

U.S. PATENT DOCUMENTS

| | | | |
|---|---|---|---|
| 3,417,897 A | * | 12/1968 | Johnson |
| 4,393,813 A | * | 7/1983 | Sou ........................... 119/72.5 |
| 4,714,181 A | * | 12/1987 | Kozlowski et al. .......... 222/480 |
| 4,821,678 A | * | 4/1989 | Atchley ....................... 119/464 |
| 4,898,292 A | * | 2/1990 | VerWeyst et al. ........... 215/237 |
| 5,139,181 A | * | 8/1992 | VerWeyst .................... 222/480 |
| 5,301,634 A | * | 4/1994 | Ho ............................... 119/477 |
| 5,363,802 A | * | 11/1994 | Huff ............................. 119/475 |
| 5,447,118 A | * | 9/1995 | Huff et al. ................... 119/477 |
| 5,549,074 A | * | 8/1996 | Hui .............................. 119/477 |
| 5,669,329 A | * | 9/1997 | Krause ....................... 119/72.5 |
| 5,706,761 A | * | 1/1998 | Mayer ......................... 119/475 |
| 5,893,339 A | * | 4/1999 | Liu .............................. 119/792 |
| 5,934,222 A | * | 8/1999 | Hwang ......................... 119/72 |
| 6,079,586 A | * | 6/2000 | Hanneman ................... 220/526 |
| 6,142,100 A | * | 11/2000 | Marchioro .................... 119/54 |

* cited by examiner

Primary Examiner—Charles T. Jordan
Assistant Examiner—Yvonne R. Abbott
(74) Attorney, Agent, or Firm—Harris Zimmerman, Esq.

(57) ABSTRACT

A water tank for supplying water to a caged animal includes a cylindrical container having an open upper end and a threaded lower neck opening. The upper opening is provided with a hinged, flip-top closure for easy filling, the closure being open to ambient air pressure. Joined to the lower neck opening is a dispenser assembly that includes a threaded cap received on the threaded neck, and dispenser tube extending obliquely from the bottom of the cap. Within the dispenser tube, a stainless steel valve assembly is secured, and a valve stem assembly extends to the lower opening of the dispenser tube. An animal may use its tongue to depress the valve stem assembly and cause a small amount of water to flow gravitally from the tank through the tube to the animal. The displaced liquid is replaced by air flowing into the non-sealed top opening, so that there is no retrograde air flow through the valve assembly to introduce contaminants. The tank is provided with a plurality of annular ridges spaced in equal increments along the vertical (axial) extent thereof. A tank mounting assembly includes a bracket having a partial annulus that defines a pair of opposed arms. The tank may be snap-engaged by the arms, which are dimensioned to fit between two adjacent annular ridges. The mounted height of the tank may be selected by snap-engaging the mounting bracket between selected annular ridges. The bracket may be secured to the vertical or horizontal wires of the cage.

14 Claims, 5 Drawing Sheets

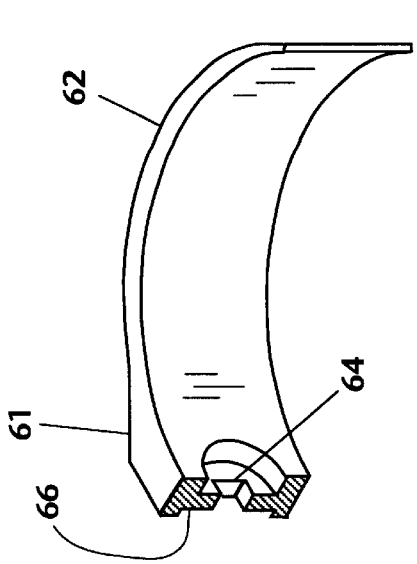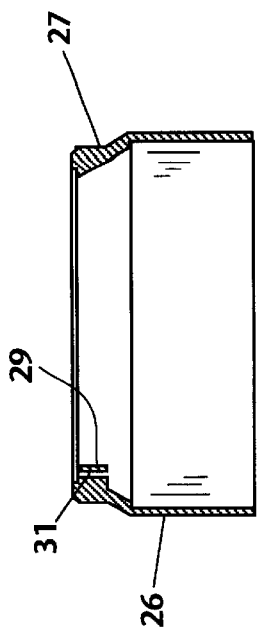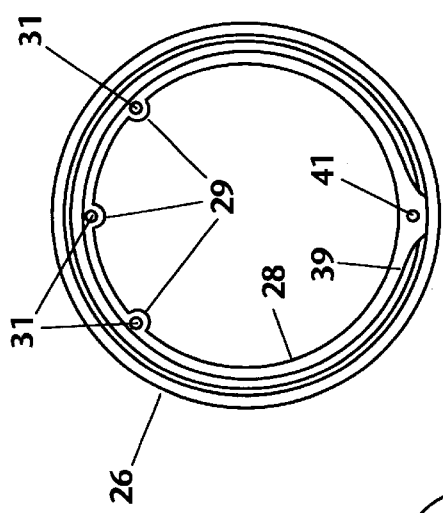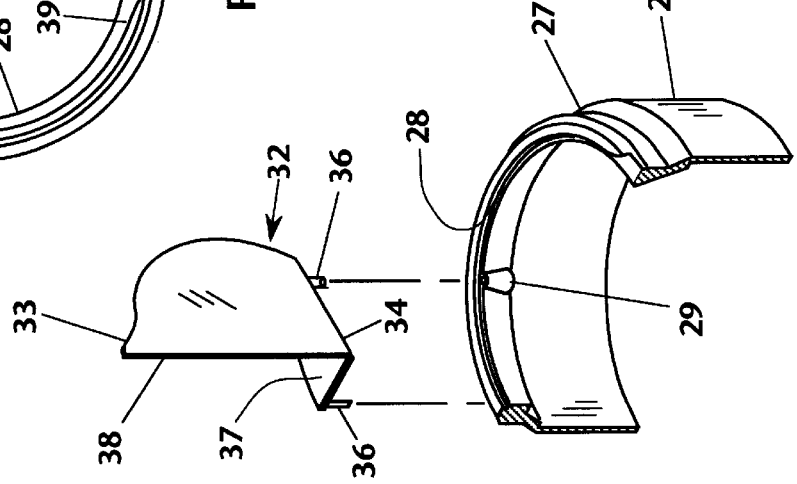

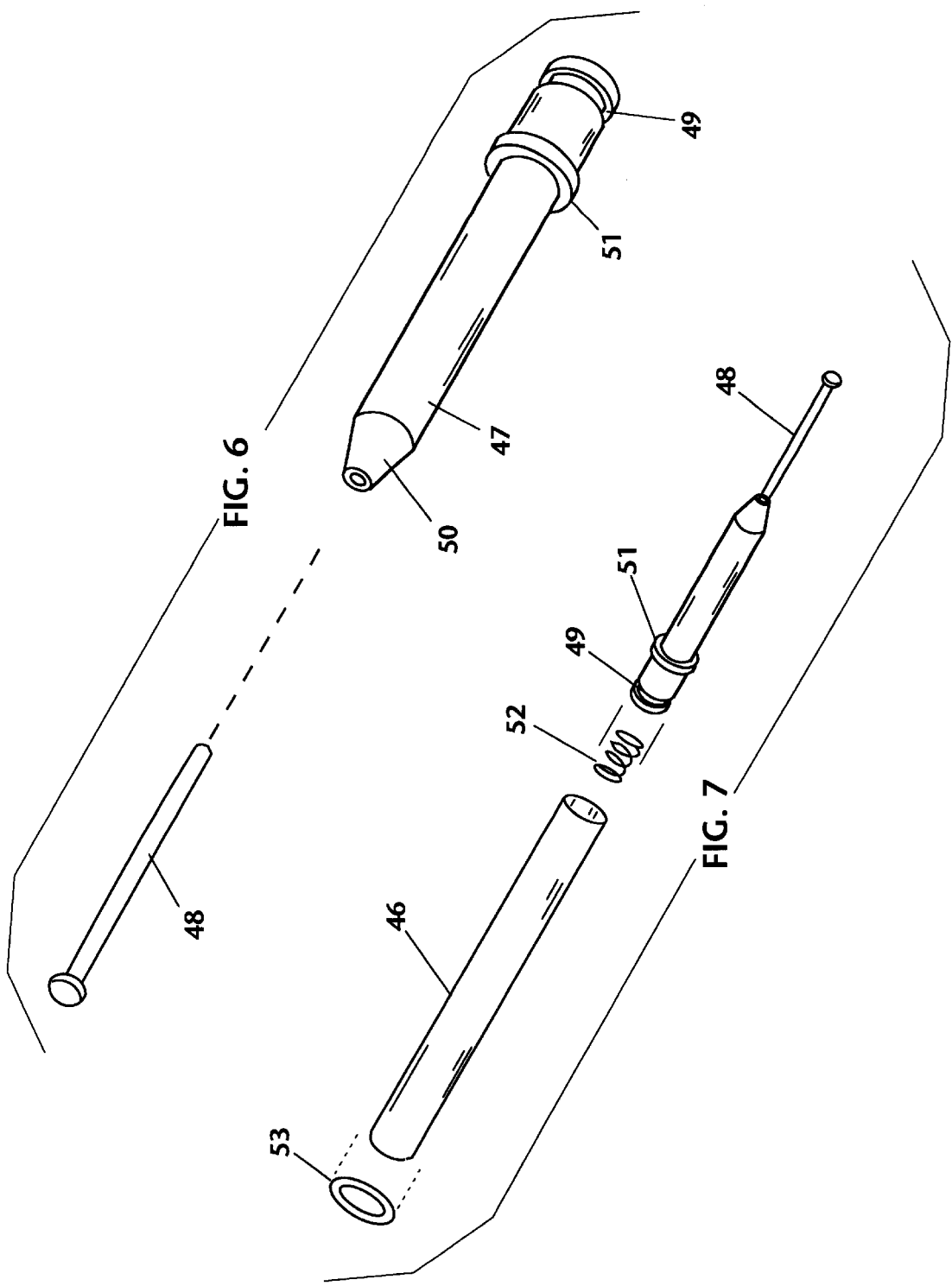

ANIMAL WATERING APPARATUS

BACKGROUND OF THE INVENTION

This invention relates to animal watering devices, and, more particularly, to inverted bottle watering devices for on-demand watering in animal enclosures.

Animal watering devices were initially developed as a means for tending caged laboratory animals in a cost-effective manner. A common design that has evolved includes an inverted bottle having a depending outlet spout, and some form of metering device that emits water when touched or licked by the animal. Often, the bottle is secured to the exterior of a wire cage or the like, and the depending spout extends obliquely through the cage wall to be accessible to the animal.

The most widely used metering devices employ some form of mechanism in which a ball is secured in the lower end opening of the outlet spout to block outflow therefrom. The ball may be secured by spring pressure, water pressure, and/or gravital force in the outlet opening, and may be dislodged by the animal to permit water to flow past the ball in small amounts, whereby the animal may lick or nuzzle the ball to obtain sufficient water when required.

One means of limiting leaking of metering ball assemblies in the prior art is to employ a sealed bottle, so that water discharged from the metering ball assembly must be replaced by air entering the bottle through the metering ball assembly. This arrangement creates air bubbles moving retrograde through the ball valve assembly, and contaminant particles may travel with the air bubbles and corrupt the liquid within the sealed bottle. Moreover, the sealed bottle construction must be unmounted and opened for cleaning and refilling, resulting in increased labor and expense involved in maintaining caged animals, particularly in a laboratory setting where a large number of animals are kept.

A widespread problem found in such prior art devices involves the ball valve metering devices, which are prone to fouling, clogging, and dripping. For example, the ball may accumulate superficial deposits that precipitate from the animal saliva or minerals in the water, and the precipitates disrupt the seal between the outlet opening and the ball. In addition, small changes in barometric pressure may cause a pressure imbalance between the water within the bottle and the ambient air, resulting in leakage past the ball. Leaking water may cause the animal cage to become damp or wet, and can result in a greater potential for disease in caged animals.

Other animal watering arrangements known in the prior art employ metering valves to deliver water on demand to the animal. Generally these devices include valve stems that protrude or extend from a delivery tube, so that the animal may draw water from the bottle by deflecting the valve stem. Unfortunately, animals that are bored or anxious may bite or play with the valve stem and dislodge or break it, causing replacement and maintenance problems.

Thus it is clear that an on-demand water dispensing arrangement that forms a leakproof seal yet which permits easy access is lacking in the prior art.

SUMMARY OF THE INVENTION

The present invention generally comprises a water tank for supplying water and other liquids to an animal maintained in a cage. The tank generally comprises a cylindrical container having an open upper end and a threaded lower neck opening. the upper opening is provided with a hinged, flip-top lid or closure assembly for easy filling, the closure assembly being non-sealed and generally communicating with ambient air pressure. Joined to the lower neck opening is a dispenser valve assembly that includes a threaded body received on the threaded neck, and a dispenser tube extending obliquely from the bottom of the threaded body. Within the dispenser tube, a stainless steel valve stem assembly is secured that extends to the lower opening of the dispenser tube. An animal may use its tongue to depress the valve stem assembly and cause a small amount of water to flow gravitally from the tank through the tube to the animal. The displaced liquid is replaced by air flowing into the non-sealed top opening, so that there is no retrograde air flow through the valve assembly to introduce contaminates.

The valve stem assembly is comprised of a valve stem having a pin extending distally from one end thereof. The proximal end of the valve stem includes an O-ring groove, and an annular flange extending radially as a spring keeper. The O-ring forms a seal with the coined proximal end surface of the dispenser tube, and each depression of the pin by the animal breaks the seal and permits a small amount of liquid to flow past the flange. However, the O-ring is too large to pass into the dispenser tube, and thus prevents removal of the valve assembly by an animal.

The tank is formed of a translucent polymer material such as polypropylene or the like, and is provided with a plurality of annular ridges spaced in equal increments along the vertical (axial) extent thereof. A tank mounting assembly includes a bracket having a partial annulus that defines a pair of opposed arms. The diameter of the partial annulus is approximately the same as the outer diameter of the tank, and the arms are resilient and define an opening of approximately 90°. The tank may be snap-engaged by the arms, which are dimensioned to fit between two adjacent annular ridges. The mounted height of the tank may be selected by snap-engaging the mounting bracket between selected annular ridges.

The bracket further includes a central web portion from which the two opposed arms extend. A bolt hole extends through the central web portion, and a square recess is formed in the outer surface about the bolt hole. A pair of clamping pads are provided, each comprising a rectangular block having an outer surface with a square protrusion extending therefrom that is adapted to be received in the square recess of the bracket. Each clamping pad has an inner surface including a plurality of closely adjacent parallel grooves for engaging the wires of an animal cage. A bolt hole extends through each clamping pad, centered in the square protrusion. The pads are adapted to be disposed with the inner, grooved surfaces in confronting relationship and the wires (horizontal or vertical) of the cage disposed therebetween. One clamping pad has its square protrusion socketed in the square recess of the clamping bracket, and a bolt extends through the medial web of the bracket and the two clamping pads. A wing nut secured to the bolt compresses the pads and entrains the cage wires therebetween, and secures the pads and bracket as a rigid assembly supported by the cage wires. The clamping pads may be disposed vertically or horizontally to engage horizontal or vertical wires of the cage.

The tank mounting assembly is secured to the wires of an animal cage, with the mounting bracket disposed exteriorly of the cage. The tank may be secured to the bracket at any convenient height, with the dispenser tube extending obliquely downwardly and laterally through the cage wall to be accessed by the animal. The top opening of the tank is accessible outside the cage for refilling, and the tank may easily be snap disengaged from the mounting bracket for cleaning or replacement.

BRIEF DESCRIPTION OF THE DRAWINGS

FIG. 2 is a partially cutaway exploded perspective view of the top assembly of the animal watering apparatus of the present invention.

FIG. 3 is a cross-sectional elevation of the top of the animal watering apparatus of the present invention.

FIG. 4 is a top plan view of the top depicted in FIG. 3.

FIG. 5 is a partially cutaway perspective view of a portion of the mounting bracket of the apparatus of the present invention.

FIG. 6 is an exploded perspective view of the valve stem assembly of the apparatus of the present invention.

FIG. 7 is an exploded perspective view of the valve assembly of the apparatus of the present invention.

DESCRIPTION OF THE PREFERRED EMBODIMENT

Figure 1:
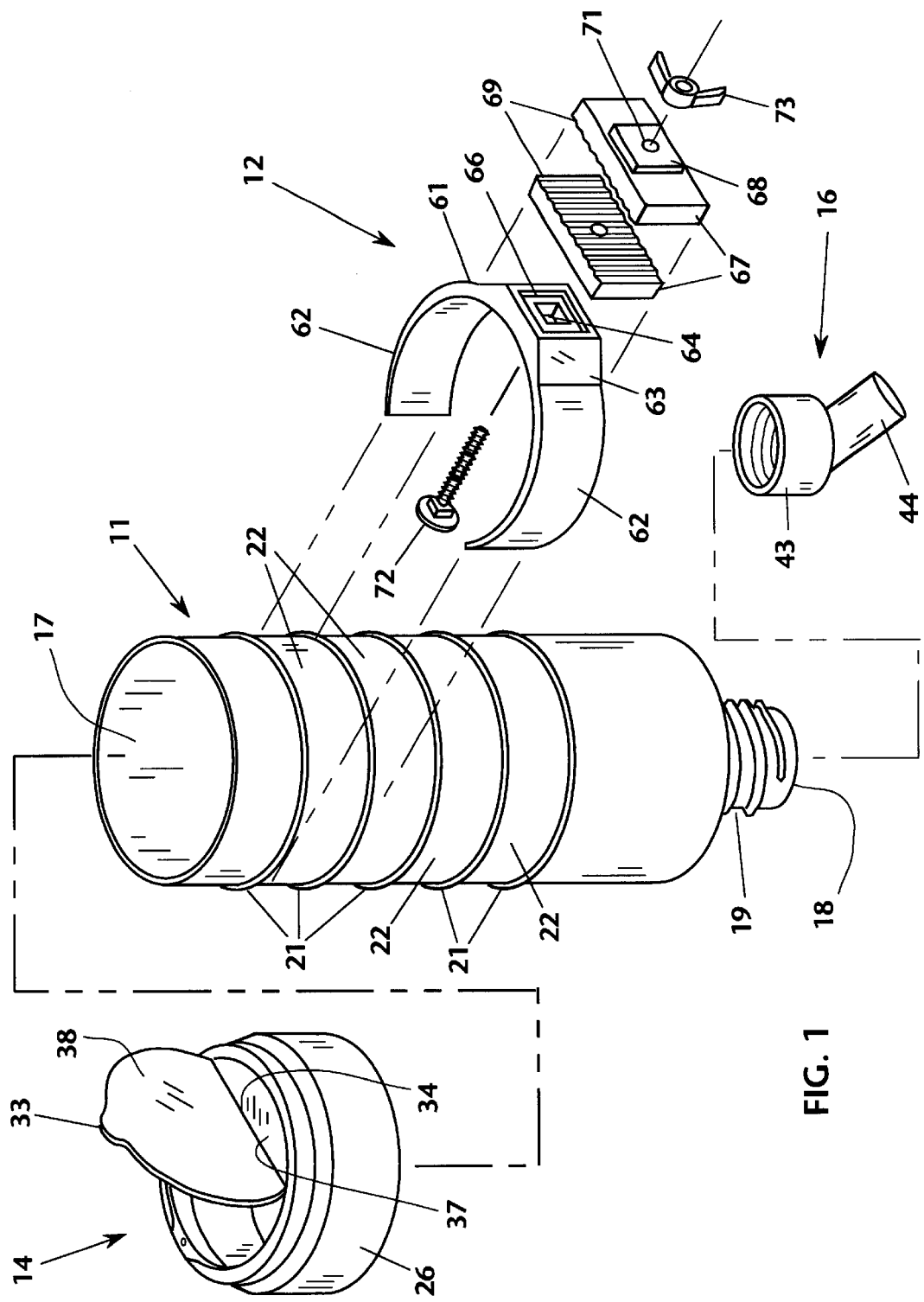
FIG. 1 is an exploded view of the major structural components of the animal watering apparatus of the present invention.

The present invention generally comprises a water tank apparatus for supplying water and other liquids to an animal maintained in a cage. With regard to the accompanying Figures, and FIG. 1 in particular, the apparatus broadly includes a liquid tank 11 that is supported by a tank mounting assembly 12 on the wires of an animal cage 13. A flip-top lid assembly 14 closes the upper end of the cylindrical tank 11, and a valve assembly 16 is secured to the lower end of the tank to deliver liquid, generally water, on demand to the animal residing in the cage 13. The tank mounting assembly 12 secures the tank 11 to an exterior surface of a cage wall, with the valve assembly 16 extending into the cage to be accessible to the animal therein.

The tank 11 comprises a generally cylindrical container having an open upper end 17 and a narrow lower opening 18 that extends through an exteriorly threaded neck 19. A plurality of annular ridges 21 are formed integrally in the outer surface of the tank 11, and are spaced apart equally along the vertical (axial) length of the tank to define therebetween a plurality of annular lands 22 spaced vertically along the exterior of the tank. The tank may be formed of a translucent polymer material such as polypropylene or the like that permits visualization of the level of the contents of the tank, and which is strong and durable.

The open upper end 17 of the tank 11 is closed by the flip-top lid assembly 14, shown in FIGS. 2–4. The assembly 14 includes a cap 26, which is a cylindrical component having an inner diameter dimensioned to receive the outer diameter of the tank 11 in removable, close fit. The upper end of the cap 26 is provided with a small tapered portion 27, and an inner lip 28 defines an upper opening of the cap. A trio of lugs 29 are molded into the cap at the margin of the lip 28, each lug including a hole 31 extending therethrough parallel to the axis of symmetry of the cap. The flip-top lid assembly 14 also includes a top panel 32 comprising a disk having a generally circular configuration with a tab 33 extending radially from the edge thereof, the tab 33 being diametrically opposed to the medial lug 29. The panel 32 also includes an integral hinge 34 comprising a score line extending chordally generally between the outermost two lugs 29. A trio of pins 36 extend from the inner surface of the first portion of panel 32 and are disposed to be permanently snap-engaged in the holes 31 of the cap 26, whereby a first portion 37 of the panel 32 is fixed to the cap 26, and a second portion 38 of the panel 32 is hingedly pivotable from the cap assembly. An annular inset 39 is formed in the inner lip 28 to receive the panel 32 so that the panel 32 is flush with the top surface of the cap 26. A hole 41 in the inner lip 28 is disposed to releasibly snap-engage a pin (like pins 36) extending from the tab 33, whereby the second portion 38 may be releasibly secured in the closed disposition.

Figure 8:
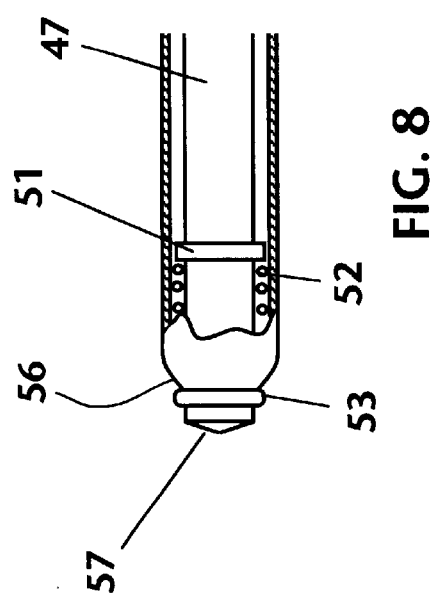
FIG. 8 is a partially cross-sectioned enlarged side elevation of the proximal end of the dispenser tube assembly of the invention.
Figure 9:
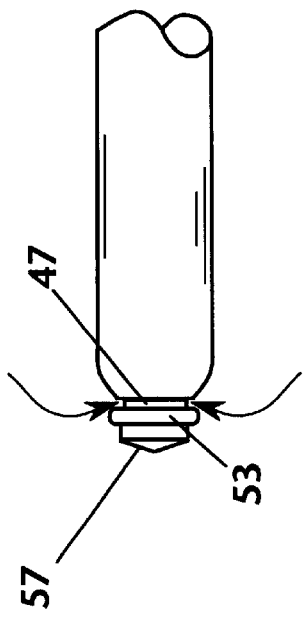
FIG. 9 is a side elevation of the proximal end of the dispenser tube assembly, shown in the open valve disposition.
Figure 11:
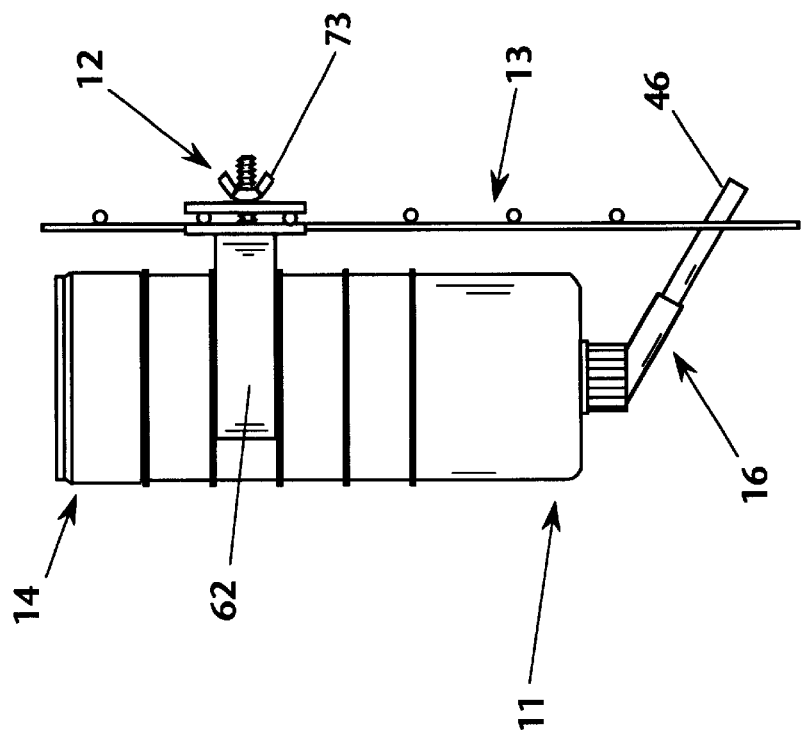
FIG. 11 is a side elevation showing a typical installation of the apparatus of the present invention, the mounting bracket being secured to the horizontal wires of an animal cage.

The valve assembly 16, shown in FIGS. 1, 6, and 7, includes an internally threaded cap 43 that is dimensioned to be threaded onto the neck 19 at the lower end of the tank. An outlet tube 44 extends integrally from the cap 43, and includes a flow path extending axially therethrough. With regard to FIGS. 6 and 7, a dispenser tube 46 is press fit in the outlet tube 44, disposed at an angle of approximately 30° from horizontal and extending beyond the vertical profile of the tank 11. The proximal end of the tube 46 is provided with a coined edge 56 turned inwardly, as shown in FIGS. 8 and 9. A valve stem assembly includes a valve body 47 extending longitudinally in the tube 46, and a round-head pin 48 secured in the distal tapered end 50 of the body 47 and coaxial therewith. The valve body 47 includes an O-ring groove 49 at the proximal end thereof, and a spring keeper flange 51 extends outwardly from the body 47, the flange 51 being spaced apart from the O-ring groove 49.

The proximal end 57 of the valve body extends through the coined proximal end of the tube 46, and an O-ring 53 is disposed in the groove 49 proximal to the coined edge 56 to form a liquid seal therewith, as shown in FIG. 8. A helical spring 52 extends about the valve body 47 between the keeper flange 51 and the inner extent of the proximal end of the tube 46. The spring 52 is in compression, and resiliently biases the valve assembly distally in the tube 46. Thus an animal may depress the pin 48 proximally (inwardly) in the tube 46, releasing the seal of the O-ring 53 with the coined edge of the tube 46 and permitting the flow of a small quantity of liquid down the tube 46, as shown in FIG. 9. The spring 52 automatically restores the seal whenever the animal stops depressing the pin 48, so that no liquid leaks inadvertently into the cage. The O-ring is larger in diameter that the coined edge of the tube, and acts to prevent the valve stem from moving distally in the tube 46, and thus blocks removal of the valve assembly from the tube 46 by the animal.

The tank mounting assembly 12, shown in FIGS. 1 and 5, includes a mounting bracket 61 having a partial annulus that defines a pair of opposed curved arms 62 extending from a medial portion 63. The diameter of the partial annulus is approximately the same as the outer diameter of the tank 11, and the arms 62 are resilient and define an opening of approximately 90°. The tank 11 may be snap-engaged by the arms 62, which are dimensioned to fit between two adjacent annular ridges 21. The mounted height of the tank 11 may be selected by snap-engaging the arms 62 on any selected annular land 22.

The medial portion 63 of the bracket includes a bolt hole 64 extending therethrough, and a square recess 66 is formed on the outer surface about the bolt hole 64. A pair of substantially identical clamping pads 67 are provided, each comprising a rectangular block having an outer surface with a square protrusion 68 extending therefrom that is adapted to be received in the square recess 66 of the bracket. Thus either clamping pad may be secured to the bracket, and may be oriented in a horizontal or vertical disposition. Each clamping pad 67 has an inner surface including a plurality of closely adjacent parallel grooves 69 for engaging the wires of an animal cage. A bolt hole 71 extends through each clamping pad, centered in the square protrusion. The pads 67 are adapted to be disposed with the inner, grooved surfaces 69 in confronting relationship and the wires (horizontal or vertical) of the cage disposed therebetween. One clamping pad 67 has its square protrusion 68 socketed in the square recess 66 of the clamping bracket, and a bolt 72 extends through the medial web 63 of the bracket and the two clamping pads 67. A wing nut 73 secured to the bolt 72 compresses the pads 67 and entrains the cage wires therebetween, and secures the pads 67 and bracket as a rigid assembly supported by the cage wires.

Figure 10:
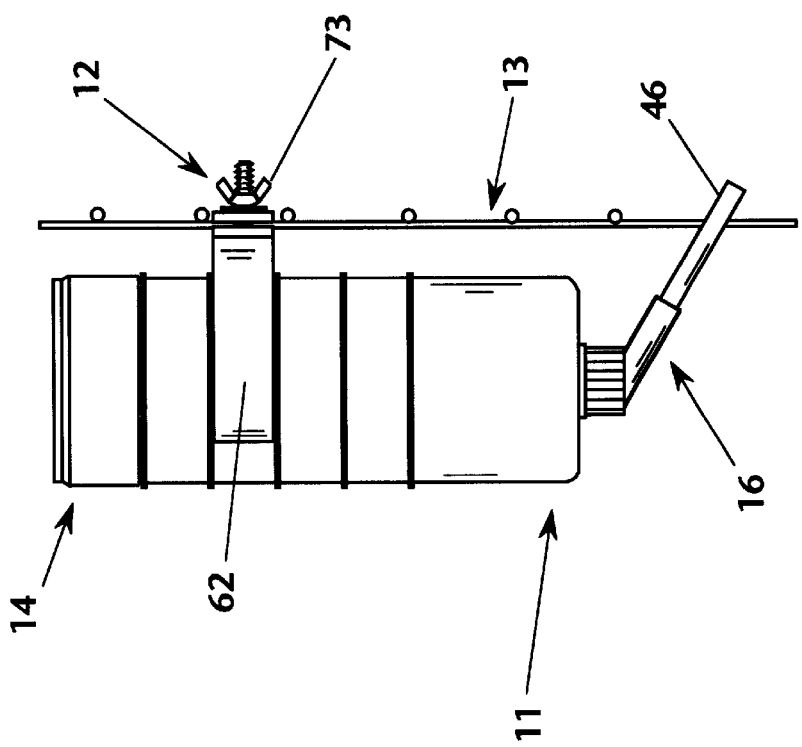
FIG. 10 is a side elevation showing a typical installation of the apparatus of the present invention, the mounting bracket being secured to the vertical wires of an animal cage.

With regard to FIGS. 1 and 10, the tank mounting assembly 12 may be secured to the vertical wires of an animal cage 13, with the mounting bracket 61 disposed exteriorly of the cage and the distal end of the dispenser tube 46 extending into the interior of the cage for access by the animal. Alternatively, as shown in FIG. 1, the mounting pads 67 may be rotated 90° and disposed to engage the horizontal wires of the cage wall. The tank 11 may be secured to the bracket 61 at any convenient height by selection of the land 22 that is engaged by the arms 62 of the bracket 61. The hinged top opening 38 of the tank 11 is accessible outside the cage for refilling, and the tank 11 may easily be snap disengaged from the mounting bracket 61 for cleaning or replacement, without disturbing or interacting with the animal in the cage. Moreover, the animal cannot dislodge or remove the tank assembly from the cage wall, and cannot remove or dislodge the valve assembly from the dispenser tube.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. An apparatus for delivering water to an animal in a cage, including:
    a water tank having an open end and a lower opening;
    a top closure assembly for releasably closing said open upper end;
    dispensing valve means secured to said lower opening for delivering water on demand to the animal in the cage;
    mounting bracket means for securing said water tank to the exterior of wall of the cage, with said dispensing valve means extending from said tank to the interior of the cage, said mounting bracket means including means for securing said water tank at any one of a plurality of selected mounting heights, and including a mounting bracket having a pair of opposed arms, said arms being resilient and spaced apart to received said water tank in snap-engaging fashion, said mounting bracket including a medical portion from which said arms extend in opposed fashion and a geometric recess formed in an outer surface of said medical portion of said mounting bracket, said mounting bracket means which includes a pair of clamping pads, at least one of said pair of clamping pads having an outer surface with a geometric projection extending therefrom, said geometric adapted to be received in said geometric recess of said medical portion of said bracket in non-rotating fashion.

2. The apparatus of claim 1, said clamping pads including opposed inner surfaces, each inner surface having closely spaced, shallow grooves disposed in parallel array to engage the wires of a cage wall.

3. The apparatus of claim 2, wherein said mounting bracket means includes bolt holes extending through said medial portion of said bracket and said pair of clamping pads, a bolt dimensioned to extend through said medial portion and said clamping pads, and a nut secured to said bolt to compress said clamping pads against said medial portion of said bracket to entrain wires of the cage wall therebetween.

4. The apparatus of claim 2, wherein said one clamping pad may be selectively secured with said geometric projection disposed in a first angular relationship to said geometric recess and said grooves are oriented in a generally horizontal disposition, or in a second angular relationship to said geometric recess with said grooves in a generally vertical disposition.

5. An apparatus for delivering water to an animal in a cage, including:
    a water tank comprising a generally cylindrical container having a cylindrical outer surface, an open upper end, and a lower opening;
    a top closure assembly for releasably closing said open upper end;
    dispensing valve means secured to said lower opening for delivering water on demand to the animal in the cage;
    mounting bracket means for securing said water tank to the exterior of a wall of the cage, with said dispensing valve means extending from said tank to the interior of the cage, said mounting bracket means includes a mounting bracket having a pair of opposed arms, said arms being resilient and spaced apart to receive said water tank in snap-engaging fashion, said mounting bracket means including means for securing said water tank at any one of a plurality of selected mounting heights; and
    wherein said water tank includes a plurality of annular ridges formed integrally in said outer surface of said tank, extending radially outwardly from said outer surface of said water tank, and being spaced apart equally longitudinally therealong to define a plurality of annular lands, and said mounting bracket arms are dimensioned to be snap-engaged about any selected one of said annular lands to set the mounted height of said tank on said mounting bracket means.

6. An apparatus for delivering water to an animal in a cage, including:
    a water tank comprising a generally cylindrical container having an open upper end and a lower opening;

a flip-top closure assembly for releasably closing said open upper end;

dispensing valve means secured to said lower opening for delivering water on demand to the animal in the cage;

mounting bracket means for securing said water tank to the exterior of a wall of the cage, with said dispensing valve means extending from said tank to the interior of the cage;

said flip-top closure assembly including a cylindrical cap having an opening therethrough with an inner diameter dimensioned to removably receive an outer diameter of said open upper end of said tank, an upper end of said cap which includes an inner lip which defines an upper opening of said cap which includes a plurality of lugs molded into said cap at a margin of said lip, each lug including a respective hole extending therethrough parallel to an axis of symmetry of said cap, said flip-top closure assembly which further includes top panel comprising a disk having a generally circular configuration with a first portion which includes a corresponding pin for each of said holes of said lugs which extend from an inner surface of said first portion of said disk and adapted to snap-engage the respective of said holes in said lugs, whereby said first portion of the disk is affixed to said cap to partially cover said upper opening of said cap, said disk further includes a movable second portion hingedly connected to and which extends radially outwardly from an edge of said first portion in a diametrically opposite direction from said lugs to selectively completely cover and partially uncover said upper opening of said cap.

7. The apparatus of claim 6, wherein said inner lip of said cap includes an additional hole extending therethrough opposite said holes and parallel to said axis of symmetry of said cap, and wherein said second portion of said disk includes a pin which extends from an inner surface of said second portion of said disk adapted to releasibly snap-engage said additional hole whereby said second portion may be releasibly secured in a closed position.

8. The apparatus of claim 6, wherein said cap includes an annular inset formed in said inner lip to receive said disk such that said disk is substantially flush with a top surface of said cap, and further including a tab extending from said second portion radially outwardly opposite said hinge and being adapted for opening and closing said second portion.

9. An apparatus for delivering water to an animal in a cage, including:

a water tank having an open upper end and a lower opening;

a top closure assembly for releasably closing said open upper end;

dispensing valve means secured to said lower opening for delivering water on demand to the animal in the cage;

mounting bracket means for securing said water tank to the exterior of a wall of the cage, with said dispensing valve means extending from said tank to the interior of the cage;

said dispensing valve means including a dispenser tube in flow communications with said lower opening, and a valve assembly secured to said dispenser tube, wherein said valve assembly includes a valve body generally disposed in said dispenser tube, and a valve stem secured to said valve body in coaxial, end-to-end conjunction, said valve stem having a rounded distal end disposed at a distal end of said dispenser tube, said valve body which includes a proximal end and an O-ring groove disposed adjacent to said proximal end in which an O-ring is disposed, said dispenser tube which includes a proximal end having an end surface, said valve body and O-ring being biased against said edge to form a seal with said end surface of said dispenser tube so that no liquid leaks inadvertently into the cage and such that each depression of said pin by the animal breaks the seal to permit a small amount of liquid to flow past said valve body and stem inside said dispenser tube to the animal.

10. The apparatus of claim 9, wherein said proximal end of said dispenser tube being coined to form an inwardly turning edge at said proximal end of said dispenser tube and said end surface.

11. The apparatus of claim 10, wherein said valve body includes an annular spring keeper flange, and a helical spring extending in compression between said keeper flange and the inner extent of said proximal end of said dispenser tube to resiliently bias said valve assembly distally in said dispenser tube and bias said O-ring against said end surface of said dispenser tube.

12. The apparatus of claim 11, wherein said proximal end of said valve body and said O-ring are disposed exteriorly and proximally to said proximal end of said dispenser tube, said O-ring being larger in diameter than said coined edge to prevent said valve stem from passing into said dispenser tube to prevent removal of said valve assembly by the animal.

13. An apparatus for delivering water to an animal in a cage, including:

a water tank having an open upper end and a lower opening;

a top closure assembly for releasably closing said open upper end;

dispensing valve means secured to said lower opening for delivering water on demand to the animal in the cage;

mounting bracket means for securing said water tank to the exterior of a wall of the cage, with said dispensing valve means extending from said tank to the interior of the cage;

said dispensing valve means including a dispenser tube in flow communications with said lower opening, and a valve assembly secured to said dispenser tube;

wherein said valve assembly includes a valve body generally disposed in said dispenser tube, and a valve stem secured to said valve body in coaxial, end-to-end conjunction, said dispenser tube which includes a proximal end, said proximal end being coined to form an inwardly turning edge at said proximal end of said dispenser tube, said valve body which includes a proximal end and an O-ring groove disposed adjacent to said proximal end and an annular spring keeper flange, a helical spring extending in compression between said keeper flange and the inner extent of said proximal end of said dispenser tube, said valve stem having a rounded distal end disposed at a distal end of said dispenser tube.

14. The apparatus of claim 13, wherein said proximal end of said valve body and said O-ring are disposed exteriorly and proximally to said proximal end of said dispenser tube.

* * * * *